(12) United States Patent
Marupaduga (10) Patent No.: US 11,297,671 B1
(45) Date of Patent: Apr. 5, 2022

(54) USE OF UPLINK PATH LOSS AS A BASIS TO CONTROL CONFIGURATION OF DUAL-CONNECTIVITY SERVICE

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 4 days.

(21) Appl. No.: 16/842,475

(22) Filed: Apr. 7, 2020

(51) Int. Cl.
*H04W 76/16* (2018.01)
*H04W 72/04* (2009.01)
*H04W 48/20* (2009.01)
*H04W 52/24* (2009.01)

(52) U.S. Cl.
CPC ......... *H04W 76/16* (2018.02); *H04W 48/20* (2013.01); *H04W 52/242* (2013.01); *H04W 72/0473* (2013.01)

(58) Field of Classification Search
None
See application file for complete search history.

(56) References Cited

U.S. PATENT DOCUMENTS

| 2013/0337795 | A1* | 12/2013 | Falconetti | H04W 24/02 455/419 |
| 2016/0007221 | A1* | 1/2016 | Awad | H04W 12/084 370/329 |
| 2016/0242128 | A1* | 8/2016 | Loehr | H04W 76/27 |
| 2017/0070961 | A1* | 3/2017 | Bharadwaj | H04W 52/228 |
| 2018/0249390 | A1* | 8/2018 | Agiwal | H04W 76/20 |
| 2020/0169895 | A1* | 5/2020 | Chen | H04B 17/3913 |
| 2020/0337054 | A1* | 10/2020 | Kwok | H04W 76/27 |
| 2020/0396643 | A1* | 12/2020 | Kwok | H04W 28/0975 |
| 2020/0404724 | A1* | 12/2020 | Pedersen | H04W 36/0069 |
| 2021/0127297 | A1* | 4/2021 | Wang | H04W 28/08 |

* cited by examiner

*Primary Examiner* — Jutai Kao (57) ABSTRACT

When a first access node is considering setup of dual-connectivity service for a UE, the first access node could take into consideration the uplink path loss respectively of each of one or more candidate second access nodes, in order to decide whether to set up the dual-connectivity service for the UE and/or to decide which of the multiple second access nodes to use for the UE's dual-connectivity service. For instance, the first access node may decide to use a given candidate second access node for the dual-connectivity service of the UE, with the decision being based on the given candidate second access node having a lower measure of uplink path loss than one or more other candidate second access nodes.

20 Claims, 4 Drawing Sheets

USE OF UPLINK PATH LOSS AS A BASIS TO CONTROL CONFIGURATION OF DUAL-CONNECTIVITY SERVICE

BACKGROUND

A cellular wireless network typically includes a number of access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide a respective cell defined on a radio-frequency (RF) carrier, which could be frequency division duplex (FDD), with separate frequency channels for downlink and uplink communication, or time division duplex (TDD), with a single frequency channel multiplexed over time between downlink and uplink use. (In practice, an access node might provide multiple cells, each on a different respective carrier. But for simplicity, each cell in that scenario could be considered to be provided by a different respective access node.)

On the downlink and uplink channels, the air interface of each such cell could be configured in a specific manner to define physical resources for carrying information wirelessly between the access node and UEs.

In a non-limiting example implementation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink of the example air interface could be grouped to define physical resource blocks (PRBs) that could be allocated as needed to carry data between the access node and served UEs.

In addition, certain resources on the downlink and/or uplink of each such cell could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

Overview

When a UE enters into coverage of an example network, the UE could detect threshold strong coverage of an access node in a particular cell (e.g., a threshold strong reference signal broadcast by the access node on that carrier of that cell) and could then engage in random-access and connection signaling, such as Radio Resource Control (RRC) signaling, to establish an air-interface connection (e.g., RRC connection) through which the access node will then serve the UE in that cell.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway that provides connectivity with a transport network and a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And in that subframe, the access node could transmit to the UE a scheduling directive that indicates which PRBs will carry the data, and the access node could accordingly transmit the transport block to the UE in those PRBs.

For each such downlink transmission, the UE could then determine if the UE received transport block successfully. For instance, the transmission could carry a cyclic redundancy check (CRC) value computed based on the transport block, and the UE could compute a CRC based on the received transport block and determine whether its computed CRC matches that carried by the transmission. If the UE receives the transmission and determines that the CRC matches or otherwise that the UE received the transport block successfully, then the UE could transmit to the access node a positive acknowledgement (ACK) control message, and the access node could then proceed with transmission of a next transport block (if any) to the UE. Whereas, if the UE did not receive the transmission or determined that the CRC did not match and thus that there was an error in the received transport block, then the UE could transmit to the access node a negative acknowledgement (NACK), in response to which the access node could attempt the transmission again.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a scheduling directive indicating those upcoming PRBs, and the UE could accordingly transmit the transport block to the access node in those PRBs.

As with downlink transmission, for each transport block that the UE transmits to the access node, the access node could determine if the transport block arrived successfully, based on a CRC analysis for instance. And if the access node received the transmission successfully, then the access node could transmit to the UE an ACK and could schedule a next uplink transmission from the UE. Whereas, if the access node did not receive the transmission successfully, then the access node could transmit to the UE a NACK, and the UE could attempt retransmission to the access node.

When the industry advances from one generation of wireless technology to the next, or in other scenarios, networks and UEs may also support dual-connectivity service, where a UE is served on co-existing connections according to multiple different RATs.

For instance, a cell site (or a combination of cell sites for that matter) could be equipped with a first access node that provides service according to a first RAT ("first-RAT access node") and a second access node that provides service according to a second RAT ("second-RAT access node"), and a UE positioned within coverage of the cell site could have a first radio configured to engage in service according to the first RAT and a second radio configured to engage in service according to the second RAT. With this arrangement, the UE may be able to establish a first air-interface connection with the first-RAT access node according to the first RAT and a second air-interface connection with the second-RAT access node according to the second RAT, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection according to a single RAT (as "standalone" connectivity).

In a representative dual-connectivity implementation, the first-RAT access node could operate as a master node (MN), responsible for coordinating setup and teardown of dual-connectivity service for the UE and functioning as an anchor point for RRC signaling and core-network control signaling related to the dual-connectivity service, and the second-RAT access node could function as a secondary node (SN), mainly to provide added connectivity and increased aggregate bandwidth for the UE.

When the UE enters into coverage of such a system, the UE could initially scan for and discover threshold strong coverage of the MN under the first RAT, and the UE could responsively engage in signaling as discussed above to establish a first-RAT air-interface connection between the UE and the MN. Further, the UE could engage in attach signaling with a core-network controller via the MN, and the core-network controller and MN could coordinate establishment for the UE of at least one bearer as discussed above.

The MN could then serve the UE in a standalone mode with packet-data communications in the manner described above. Further, perhaps having determined from profile data that the UE is dual-connectivity-capable, the MN could trigger and/or engage in a process to establish for the UE a second-RAT air-interface connection between the UE and an SN, so that the MN and SN can then cooperatively provide the UE with dual-connectivity service.

For instance, the MN could direct the UE to scan for secondary coverage under the second RAT, possibly identifying one or more SNs and associated carriers for which the UE should scan, and could receive in response from the UE a report that the UE detected threshold strong coverage of one or more SNs. And the MN could then coordinate setup of dual-connectivity service with the UE being served by the MN and such an SN.

While the specifics of setting up dual-connectivity may vary from implementation to implementation, in an example, the MN could engage in signaling with the SN, with the UE, and with the core-network controller, to coordinate setup of the dual-connectivity service. For instance, the MN could engage in signaling with the UE and with the SN to coordinate setup of a second-RAT connection between the UE and the SN. And the MN could engage in signaling with the core-network controller and/or with the SN to coordinate setup of a split bearer for the UE so that the MN could serve a portion of the UE's data communications and the SN could serve another portion of the UE's data communications.

Further, various split-bearer arrangements may be possible.

In one implementation, the split bearer could be established at the gateway, with one bearer leg extending between the gateway and the MN and another bearer leg extending between the gateway and the SN. For instance, while maintaining the UE's access bearer between the MN and the gateway, the core-network controller could coordinate setup of a secondary access bearer between the SN and the gateway. With this arrangement, communications between the UE and the MN could flow over the access bearer between the MN and the gateway, and communications between the UE and the SN could flow over the access bearer between the SN and the gateway.

In another implementation, the split bearer could be established at the SN, with the UE's access bearer extending between the gateway and the SN and a leg of the bearer extending further between the SN and the MN. For instance, the core-network controller could coordinate transfer of the UE's access bearer from being between the gateway and the MN to instead being between the gateway and the SN, and the MN and SN could coordinate setup of the bearer leg between the MN and the SN. With this arrangement, communications between the SN and the UE would flow over the access bearer between the SN and the gateway, and communications between the MN and the UE would flow between the MN and the SN and likewise over the access bearer between the SN and the gateway.

And in yet another implementation, the split bearer could be established at the MN, with the UE's access bearer still extending between the gateway and the MN, and with a leg of the bearer extending between the MN and the SN. For instance, the MN could maintain the access bearer between the MN and the gateway, and the MN and SN could coordinate setup of the bearer leg between the MN and the SN. With this arrangement, communications between the MN and the UE could flow over the access bearer between the MN and the gateway, and communications between the SN and the UE could flow between the SN and the MN and likewise over the access bearer between the MN and the gateway.

With dual-connectivity service so established through this and/or other steps, the MN and SN could then concurrently serve the UE over their respective connections with the UE, perhaps with both providing for both downlink and uplink downlink scheduled data communication, or perhaps with both providing for downlink scheduled data communication but just the SN providing for uplink scheduled data communication.

On the downlink, for instance, when the core network has data destined to the UE, the MN could coordinate downlink transmission of some of the data over the air from the MN to the UE as discussed above, and the SN could coordinate downlink transmission of other of the data over the air from the SN to the UE as discussed above. Likewise, when the UE has data to transmit, the UE could send to the MN a scheduling request for transmission of some of the data to the MN, and the MN could coordinate uplink transmission of that data over the air from the UE to the MN, and the UE could send to the SN a scheduling request for transmission of other of the data to the SN, and the SN could coordinate uplink transmission of that data over the air from the UE to the SN. Or the UE could limit its uplink transmission to just the SN.

One technical issue with any such wireless communication system is the level of uplink path loss between a UE and its serving access node. Uplink path loss between a UE and a serving access node is a measure of the difference between the UE's transmit power and the access node's receive power, which can vary based on numerous factors such as distance and RF obstructions between the UE and the access node, frequency of the transmission, and antenna structure and gain at the UE and/or at the access node. For instance, higher path loss could result if a UE is more distant from the access node or there are RF obstructions in the transmission path, if the UE is transmitting on a higher-frequency carrier, and/or if there is relatively low antenna gain at the UE and/or at the access node. And lower path loss could result if a UE is closer or in more clear line-of-sight of the access node, if the UE is transmitting on a lower-frequency carrier, and/or if there is relatively high antenna gain at the UE and/or at the access node.

When there is a high level of uplink path loss of a UE's scheduled uplink transmission to an access node, the access node may have difficulty receiving and decoding that scheduled uplink transmission. As a result, the access node may encounter increased uplink transport-block errors and consequently an increased rate of uplink retransmission, which could reduce overall uplink throughput and reduce uplink-PRB availability, among other problems. Further, this issue could be magnified in a situation where the access node serves multiple UEs with high uplink path loss.

The present disclosure provides an improvement to help address this problem in the context of dual-connectivity.

In accordance with the disclosure, when an MN is considering setup of dual-connectivity service for a UE, the MN will take into consideration the level of uplink path loss experienced by each of one or more potential (candidate) SNs in order decide whether to set up dual-connectivity service for the UE and/or to decide which of multiple SNs to use as an SN for the UE's dual-connectivity service. For instance, if a candidate SN has threshold high level of uplink path loss, then, based on that fact, the MN may decide to not use that SN for dual-connectivity service of the UE. Or if a first candidate SN has lower level of uplink path loss than a second candidate SN, then, based on that fact, the MN may decide to use the first SN rather than the second SN for dual-connectivity service of the UE.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE, 5G NR, and 4G-5G dual connectivity, referred to as EUTRA-NR Dual Connectivity (EN-DC). With EN-DC, a 4G access node (4G evolved Node-B (eNB)) typically functions as the MN, and a 5G access node (5G next-generation Node-B (gNB)) typically functions as the secondary access node. Thus, a UE would first establish a standalone-4G connection with a 4G eNB, and the 4G eNB could then coordinate setup of EN-DC service for the UE, including setup for the UE of a secondary 5G connection with a 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

Figure 1:
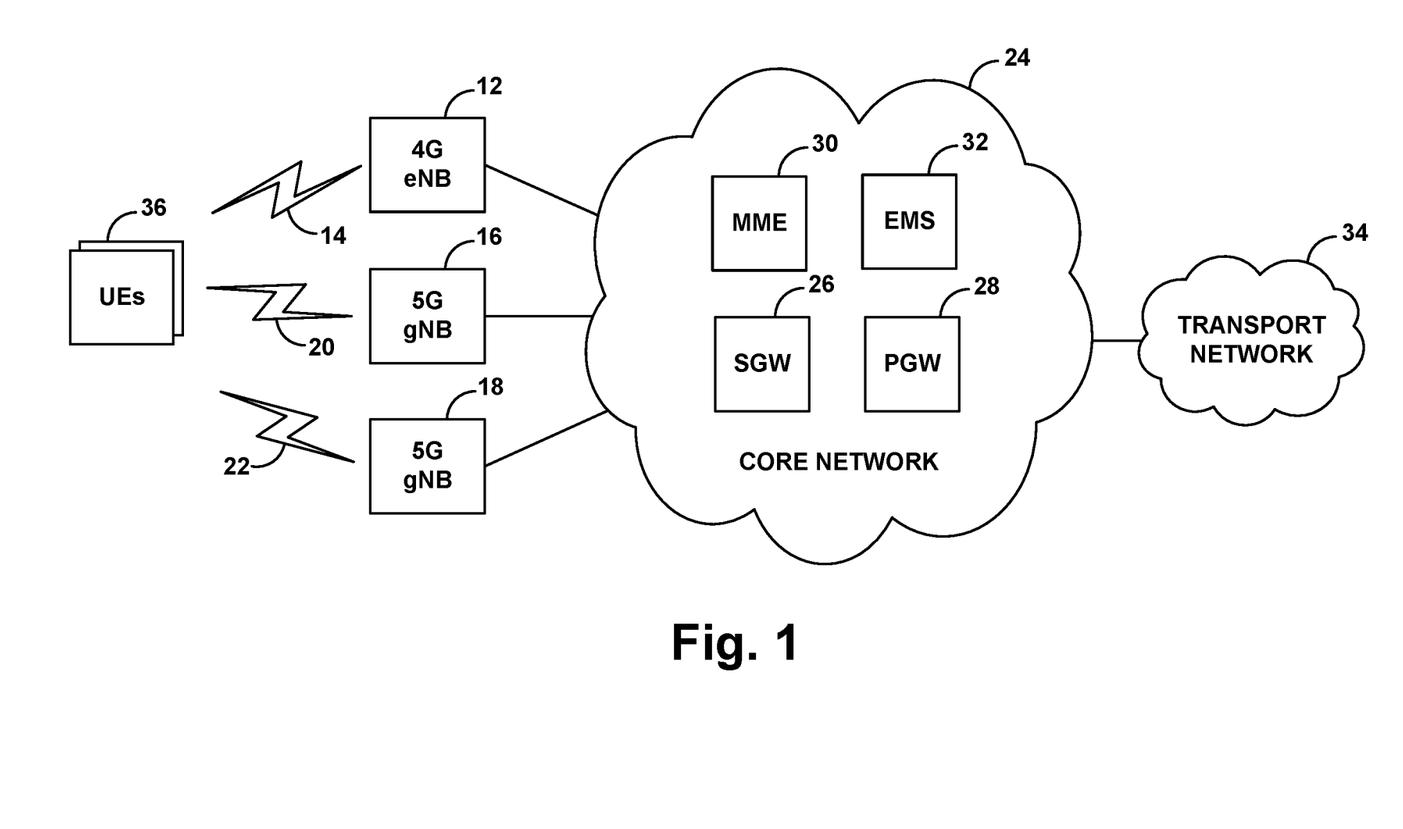
FIG. 1 is a simplified block diagram of an example network arrangement in which features of the present disclosure can be implemented.

FIG. 1 depicts an example network having a 4G eNB 12 that is configured to provide 4G service on a representative 4G carrier 14, and at least two example 5G gNBs 16, 18, configured to provide 5G service on representative 5G carriers 20, 22. Each of these access nodes could be a macro access node of the type configured to provide a wide range of coverage or could take other forms, such as a small cell access node, a repeater, a femtocell access node, or the like, which might be configured to provide a smaller range of coverage, among other possibilities. Further, these access nodes could be collocated with each other and could provide coverage in largely the same direction as each other, to define an area in which UEs can engage in both 4G service provided by the 4G eNB 12 and 5G service provided by a 5G gNB 16, 18.

In representative 4G and 5G implementations, each carrier could be FDD or TDD and could thus define separate downlink and uplink frequency channels or a single frequency channel multiplexed over time between downlink and uplink use. In any event, each frequency channel of a carrier could be characterized by a defined frequency bandwidth (width in RF spectrum) and center frequency and may have a unique carrier identifier.

Further, the air interface on each carrier could be structured as described above by way of example, being divided over time into frames, subframes, timeslots, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown, the example 4G and 5G access nodes in the example arrangement are each connected with a core network 24, such as an Evolved Packet Core (EPC) network or Next Generation Core (NGC) network. In the example shown, the core network includes a serving gateway (SGW) 26, a packet data network gateway (PGW) 28, a mobility management entity (MME) 30, and an element management system (EMS) 32, although other arrangements are possible as well.

In an example implementation, without limitation, each access node could have an interface with the SGW, the SGW could have an interface with the PGW, and the PGW could provide connectivity with a transport network 34. Further, each access node could have an interface with the MME, and the MME could have an interface with the SGW, so that the MME could coordinate setup of bearers for UEs to enable the UEs to engage in packet-data communication via 4G and 5G. Alternatively, just the 4G eNB might have an interface with the MME and may function as an anchor for signaling with the MME both for 4G service and for 5G and EN-DC service. Still further, the EMS could operate as a central data repository of operational data for the wireless communication network and to control and manage operation of various network elements.

FIG. 1 further depicts various example UEs 36 that may from time to time be within coverage of the 4G and 5G access nodes and may from time to time be served by the access nodes. In a representative implementation, each such UE may be 4G and 5G capable, including both a 4G radio and associated equipment and logic that enables the UE to connect with and be served by a 4G eNB, and a 5G radio and associated equipment and logic that enables the UE to connect with and be served by a 5G gNB. Further, each such UE could also be configured to support EN-DC service.

In line with the discussion above, upon entering into coverage of the access nodes as shown, a representative such UE 36 could initially scan for 4G coverage and discover threshold strong coverage of 4G eNB 12 on 4G carrier 14. The UE could then engage in RRC signaling with that 4G eNB to establish a 4G connection on the 4G carrier as discussed above. And if appropriate, the UE could engage in attach signaling with the MME through the 4G connection, and the MME could coordinate setup of a bearer for the UE. Further, the 4G eNB could then select a 5G gNB to provide secondary connectivity for the UE, and the 4G eNB could coordinate setup of EN-DC service for the UE, including setup for the UE of a 5G connection with the selected 5G gNB on a 5G carrier, and setup of a split bearer as discussed above. The 4G eNB and 5G gNB could then each serve the UE with packet-data communications over their respective connections with the UE, in the manner discussed above.

As further discussed above, the 4G eNB could take into account the uplink path loss of each of one or more candidate 5G gNBs in order to decide whether to set up EN-DC service for the UE and/or in order to decide which of multiple 5G gNBs to use as an SN for the UE's EN-DC service.

In a representative implementation, the 4G eNB could first identify a candidate set of one or more 5G gNBs available for possible use in EN-DC service of the UE. The 4G eNB could be pre-provisioned with data indicating this candidate set, perhaps one or more 5G gNBs that provide coverage collocated with coverage of the 4G eNB. Or the 4G eNB could direct the UE to scan for 5G coverage and could receive in response from the UE a report indicating that the UE has detected threshold strong coverage of each of one or more such 5G gNBs defining the candidate set. In the arrangement of FIG. 1, the candidate set might be 5G gNBs 16, 18. Or the candidate set might be just one of those 5G gNBs. And in another arrangement, the candidate set may include one or more other 5G gNBs, perhaps more than two.

The 4G eNB could then decide, based on a measure of uplink path loss of each 5G gNB of the candidate set, whether to set up EN-DC service for the UE. For instance, the 4G eNB could determine whether the measure of uplink path loss respectively of each 5G gNB of the candidate set is greater than a predefined threshold (e.g., a threshold set by engineering design as being unduly high), such as greater than 75 decibels (dB) or another value dictated by a wireless operator. If the 4G eNB thus determines that the measure of uplink path loss of each 5G gNB of the candidate set is greater than the predefined threshold, then, based on that determination, the 4G eNB could decide to not set up EN-DC service for the UE. Whereas if the 4G eNB thus determines that the measure of uplink path loss of at least one 5G gNB of the candidate set is not greater than the predefined threshold, then, based on that determination, the 4G eNB could decide to set up EN-DC service for the UE. The 4G eNB could then proceed accordingly.

Further, if there are at least two 5G gNBs in the candidate set, the 4G eNB could use the measure of uplink path loss per 5G gNB as a basis to select a 5G gNB from among those in the candidate set to be an SN for the UE's EN-DC service. For instance, the 4G eNB could compare the measures of uplink path loss of the candidate 5G access nodes (perhaps candidate 5G gNB each deemed to have no greater than the threshold level of uplink path loss), and the 4G eNB could select one of the 5G gNBs to be an SN for the UE's EN-DC service, with the selecting being based on a determination by the 4G eNB that the measure of uplink path loss of the selected 5G gNB is lower than the measure of uplink path loss respectively of each other 5G gNB of the candidate set.

By way of example, if the measure of uplink path loss of 5G gNB 16 is 30 dB and the measure of uplink path loss of 5G gNB 18 is 50 dB, then, based at least on the measure of uplink path loss of 5G gNB 16 being lower than the measure of uplink path loss of 5G gNB 18, the 4G eNB could select 5G gNB 16 to be an SN for the UE's EN-DC service. The 4G eNB could then coordinate setup of EN-DC service for the UE, including setup of a 5G connection between the UE and the selected 5G gNB, and setup of a split bearer, as discussed above.

To facilitate this process, the 4G eNB could have access to and refer to uplink-path-loss data that indicates a latest measure of uplink path loss respectively of each of various 5G gNBs.

Each such 5G gNB could regularly (e.g., periodically) determine a measure of its uplink path loss, as a representation of loss of electromagnetic energy of transmission(s) to the 5G gNB from one or more UEs served by the 5G gNB and could report this information to the 4G eNB and/or to another entity, such as the EMS or the MME, that the 4G eNB might query for the information or that might otherwise provide the information to the 4G eNB or make use of the information to control the 4G eNB's configuration of EN-DC service for the UE.

A 5G gNB could compute this measure of its uplink path loss by rolling up uplink path loss data computed for transmission from the 5G gNB's one or more served UEs over time.

Without limitation, for instance, each time a UE served by the 5G gNB sends to the 5G gNB a scheduling request seeking allocation of uplink resources for use by the UE to transmit to the 5G gNB, the UE could specify in its scheduling request the transmit power $P_{Tr}$ at which the UE is set to engage in uplink transmission (which the 5G gNB might adjust per a closed-loop power-control process). Alternatively, if the UE has a known maximum transmit power (e.g., 23 decibel-milliwatts (dBm), or 26 dBm) and the UE reports to the 5G gNB a power headroom value indicating a difference between the UE's maximum transmit power and the UE's currently set transmit power, then the 5G gNB could compute the UE's transmit power $P_{Tr}$ as the difference between the UE's maximum transmit power and the UE's reported power headroom value.

For each such scheduled transmission from a UE, when the 5G gNB receives the UE's transmission, the 5G gNB could measure the receive power $P_{Rx}$ of the transmission at the 5G gNB. For instance, the 5G gNB could measure this receive power at a radio or other point in the 5G gNB's RF receive chain. And the 5G gNB could then compute a path loss of the transmission as a difference between the receive power $P_{Rx}$ of the transmission and the transmit power $P_{Tr}$ of the transmission.

As the 5G gNB computes the path loss respectively of each of various transmissions from one or more UEs to the 5G gNB, the 5G gNB could roll up the computed path loss values, for instance as a rolling average or other statistical representation of the path loss measurements over a recent sliding window of time, as a representative measure of 5G gNB's uplink path loss. And in an example implementation, the 5G gNB could periodically report to the 4G eNB the latest such measure of its uplink path loss. For instance, the 5G gNB could report this measure to the 4G eNB through signaling over an inter-access-node communication interface, such as an X2 interface.

Note also that the measure of uplink path loss per 5G gNB could include current data (e.g., over a most recent or most-recently reported sliding window of time) and/or could include historical data, such as a rolled up average of the 5G gNB's uplink path loss per time of day or the like, to facilitate a prediction of uplink path loss at a current time of day. And note that the 4G eNB could keep track over time of each 5G gNB's reported uplink path loss.

The 4G eNB could thus refer to the uplink-path-loss data to determine for each 5G gNB of the candidate set whether the measure of uplink path loss of the 5G gNB is predefined threshold high. This could involve determining if the 5G gNB's actual/current measure of uplink path loss is threshold high. Alternatively or additionally, this could involve predicting, based on historical uplink-path-loss data, whether the 5G gNB's uplink path loss is now or is about to be threshold high—such as by determining that the 5G gNB tends to have a threshold high measure of uplink path loss at the current time of day.

As noted above, based on this analysis, the 4G eNB could thus decide whether to set up EN-DC service for a UE. Further, based on this analysis, the 4G eNB could select a 5G gNB from the candidate set based on the selected 5G gNB having a lower measure of uplink path loss than each other 5G gNB of the candidate set. The 4G eNB could then set up EN-DC service for the UE with respect to the selected 5G gNB, including coordinating setup of a 5G connection between the UE and the selected 5G gNB and coordinating setup of a split bearer for the UE, to allow the 4G eNB to serve a portion of the UE's data communications and the selected 5G gNB to serve another portion of the UE's data communications.

Note that uplink path loss could be one of possibly multiple factors considered by the 4G eNB in deciding whether to set up EN-DC service for the UE and/or deciding which of multiple candidate 5G gNBs to use as an SN for EN-DC service of the UE. The 4G eNB might also take into account other, additional factors, such as reported buffer-occupancy, signal strength, transmission power, resource usage, and/or the like. And also note that the analysis by the 4G eNB involves consideration of a computed measure of uplink path loss of each of one or more 5G gNBs, and therefore does not amount to merely considering or comparing the carrier frequencies of the 5G gNBs.

Further, note that the computed and reported measure of uplink path loss of each 5G gNB might vary over time, as channel conditions for transmission from the 5G gNB's served UE(s) to the 5G gNB might vary. For instance, at times, the 5G gNB might be serving mostly UEs that are positioned at quite a distance from the 5G gNB, with low antenna gain, through significant RF obstructions and/or with other circumstances where the 5G gNB might have a relatively high measure of uplink path loss. Whereas, at other times, the 5G gNB might be serving mostly UEs that are positioned in clear, close line-of-sight of the 5G gNB, with high antenna gain, and/or with other circumstances where the 5G gNB might have a relatively low measure of uplink path loss.

Therefore, the analysis conducted by the 4G eNB, taking into consideration the measure of uplink path loss respectively of each of various candidate 5G gNBs, may produce different results from time to time. For instance, at times, the 4G eNB might find that the measure of uplink path loss respectively of every 5G gNB of a set of multiple candidate 5G gNBs is threshold high, and the 4G eNB might therefore decline to configure EN-DC service, whereas at other times, the 4G eNB might find that the measure of uplink path loss of one or more 5G gNBs of the set is not threshold high, and the 4G eNB might therefore select one of the candidate 5G gNBs to be an SN for EN-DC service. Further, at times, given a set of multiple candidate 5G gNBs to be an SN for EN-DC service, the 4G eNB might select one of the 5G gNBs to be the SN on grounds that that 5G gNB has the lowest measure of uplink path loss among the candidates, whereas at other times, given the same set of candidate 5G gNBs, the 4G eNB might select a different one of the 5G gNBs to be the SN on grounds that that different 5G gNB has the lowest measure of uplink path loss among the candidates.

Figure 2:
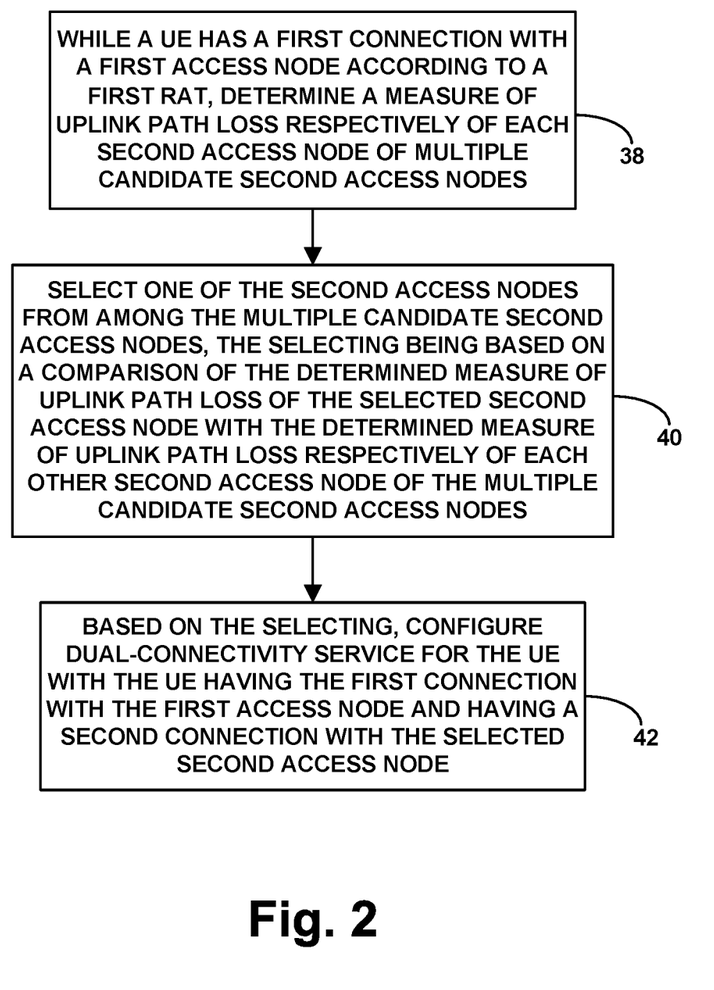
FIG. 2 is a flow chart depicting an example method in accordance with the present disclosure.

FIG. 2 is next a flow chart depicting an example method for controlling configuration of dual-connectivity service for a UE, the dual-connectivity service including the UE being served concurrently over a first connection according to a first RAT and over a second connection according to a second RAT. In an example implementation, the first RAT could be 4G LTE, the second RAT could be 5G NR, and the dual-connectivity service could be EN-DC. Further, the method could be carried out in a wireless communication system such as that shown in FIG. 1, including a first access node configured to provide service according to the first RAT and multiple second access nodes each configured to provide service according to the second RAT.

As shown in FIG. 2, at block 38, the method includes, while the UE has a first connection with a first access node according to the first RAT, the first access node determining measures of uplink path loss of multiple candidate second access nodes, including determining a measure of uplink path loss respectively of each second access node of the multiple candidate second access nodes. At block 40, the method then includes the first access node selecting one of the second access nodes from among the multiple candidate second access nodes, the selecting being based on a comparison of the determined measure of uplink path loss of the selected second access node with the determined measure of uplink path loss respectively of each other second access node (one or more) of the multiple candidate second access nodes. And at block 42, the method include, based on the selecting, configuring the dual-connectivity service for the UE with the UE having the first connection with the first access node and having the second connection with the selected second access node.

In line with the discussion above, in this method, the act of determining the measure of uplink path loss respectively of each of at least one of the second access nodes could involve receiving from the second access node the measure of uplink path loss, the measure of uplink path loss of the second access node representing a computed difference between transmit power and receive power of each of one or more uplink transmissions to the second access node.

Alternatively or additionally, the act of determining the measure of uplink path loss respectively of each of at least one of the second access nodes could involve receiving the measure of uplink path loss from a network entity to which the second access node reported the measure of uplink path loss. For instance, the second access node might report its measure of uplink path loss to an EMS or other network entity, and the first access node might query that network entity to determine the second access node's measure of uplink path loss.

Further, as discussed above, the measure of uplink path loss respectively of at least one of the second access nodes could be based on historical data, over one or more past days, for a current time of day. For instance, the second access node could report a rolled up statistical representation of its typical measure of uplink path loss for a current time of day, determined based on past days' measures made at or around the same time of day. Or the first access node or another entity (e.g., EMS or MME) could compile measures of uplink path loss of the second access node per time of day so as to establish such trend data as a basis for predicting what the second access node's measure of uplink path loss is likely to be at a current time of day.

In addition, as discussed above, the act of selecting one of the second access nodes from among the multiple candidate second access nodes could be based on the determined measure of uplink path loss of the selected second access node being lower than the determined measures of uplink path loss of each other second access node of the multiple candidate second access nodes, such as being lowest among the multiple candidate second access nodes.

Further, as discussed above, the act of configuring the dual-connectivity service for the UE with the UE having the first connection with the first access node and having the second connection with the selected second access node could involve the first access node engaging in signaling (e.g., with the selected second access node and the UE) to configure the second connection between the UE and the candidate second access node and the first access node engaging in signaling (e.g., with the second access node, with a core-network controller, and with the UE) to establish for the UE a split bearer so that the first access node and second access node can both serve the UE with data communications.

Figure 3:
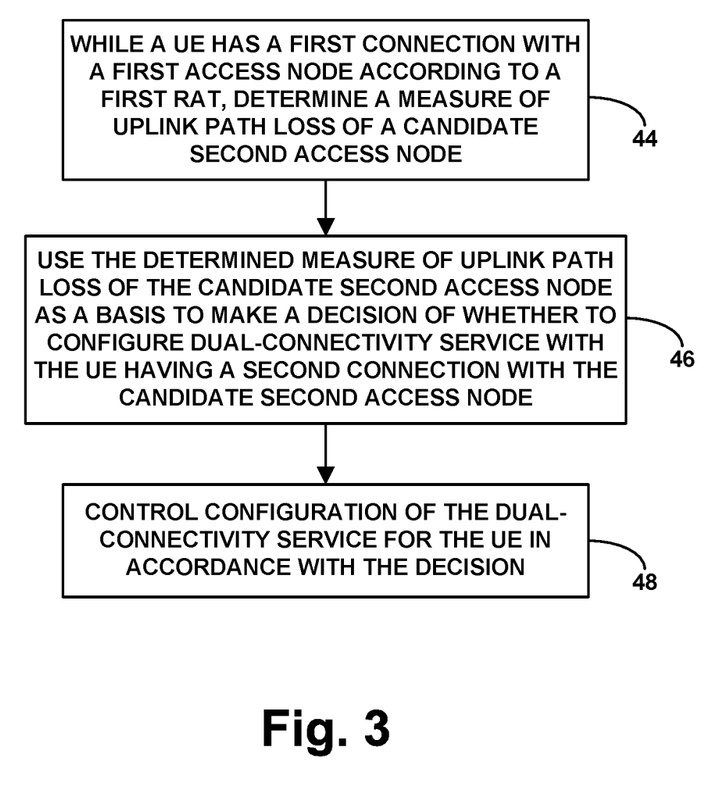
FIG. 3 is another flow chart depicting an example method in accordance with the present disclosure.

FIG. 3 is next another flow chart depicting an example method for controlling configuration of dual-connectivity service for a UE, the dual-connectivity service including the UE being served concurrently over a first connection according to a first RAT and over a second connection according to a second RAT. This method could be implemented in a context similar to that discussed above for instance.

As shown in FIG. 3, at block 44, the method includes, while the UE has a first connection with a first access node according to the first RAT, the first access node determining a measure of uplink path loss of a candidate second access node. At block 46, the method then includes the first access node using the determined measure of uplink path loss of the candidate second access node as a basis to make a decision of whether to configure the dual-connectivity service with the UE having the second connection with the candidate second access node. And at block 48, the method includes the first access node controlling configuration of the dual-connectivity service for the UE in accordance with the decision.

In line with the discussion above, in this method, the act of determining the measure of uplink path loss of the candidate second access node could involve receiving from the candidate second access node a report of the measure of uplink path loss of the candidate second access node, the measure of uplink path loss of the candidate second access node representing a computed difference between transmit power and receive power of each of one or more uplink transmissions to the candidate second access node. Alternatively, the act of determining the measure of uplink path loss of the candidate second access node could involve receiving an indication of the measure of uplink path loss from a network entity to which the candidate second access node reported the measure of uplink path loss.

Further, the act of determining the measure of uplink path loss of the candidate second access node could involve determining an actual current (e.g., most recently computed) measure of uplink path loss of the candidate second access node or could involve predicting the measure of uplink path loss of the candidate second access node based on historical data for instance. In addition, as discussed above, the act of using the determined measure of uplink path loss of the candidate second access node as a basis to make the decision of whether to configure the dual-connectivity service with the UE having the second connection with the candidate second access node could involve (i) making a determination of whether the determined measure of uplink path loss of the candidate second access node is at least predefined threshold high and (ii) responsive to the determination being that the determined measure of uplink path loss of the candidate second access node is at least predefined threshold high, then, based at least on the determination, deciding to not configure the dual-connectivity service with the UE having the second connection with the candidate second access node. As discussed above, if the first access node makes this determination for each of the UE's one or more candidate second access nodes, then the first access node may decline to configure the dual-connectivity service for the UE.

Further, as discussed above, the act of using the determined measure of uplink path loss of the candidate second access node as a basis to make the decision of whether to configure the dual-connectivity service with the UE having the second connection with the candidate second access node could involve (i) making a determination of whether the determined measure of uplink path loss of the candidate second access node is greater than a determined measure of uplink path loss of another candidate access node, (ii) if the determination is that the determined measure of uplink path loss of the candidate second access node is greater than the determined measure of uplink path loss of the other candidate access node, then, based at least on the determination, deciding to not configure the dual-connectivity service with the UE having the second connection with the candidate second access node, and (iii) if the determination is that the determined measure of uplink path loss of the candidate second access node is not greater than the determined measure of uplink path loss of the other candidate access node, then, based at least on the determination, deciding to configure the dual-connectivity service with the UE having the second connection with the candidate second access node.

And in this case, if the determination is that the determined measure of uplink path loss of the candidate second access node is greater than the determined measure of uplink path loss of the other candidate access node, then the method could additionally involve, based at least on that determination, configuring the dual-connectivity service with the UE having the second connection with the other candidate access node rather than with the candidate second access node.

Various features described above can be implemented in this context, and vice versa.

Figure 4:
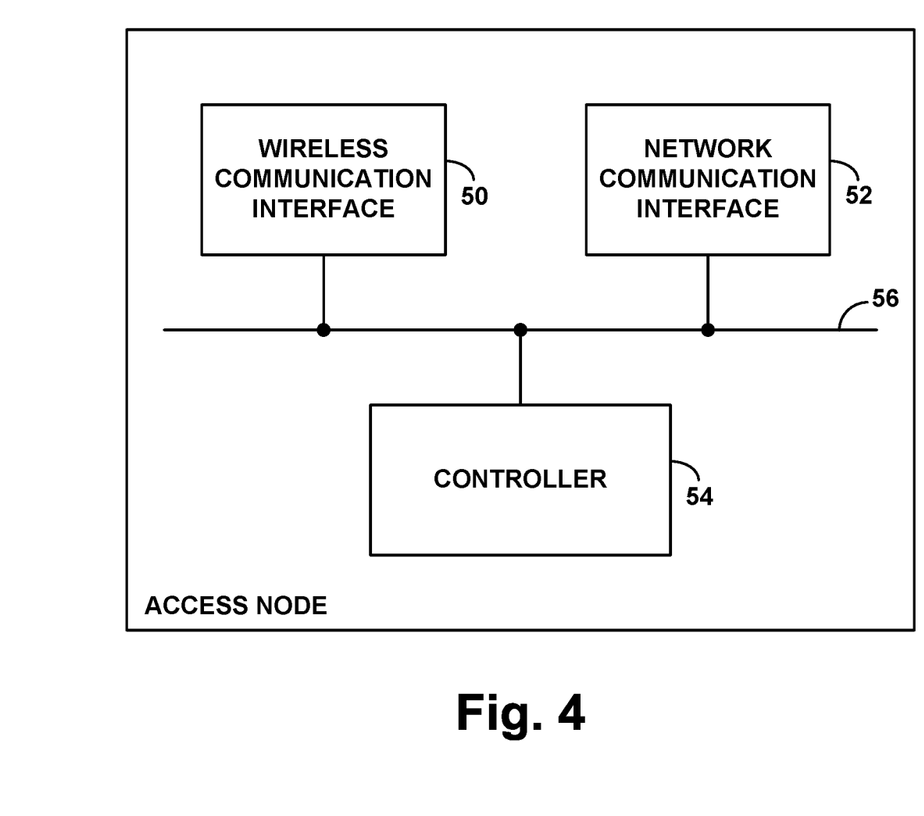
FIG. 4 is a simplified block diagram of an example access node operable in accordance with the present disclosure.

FIG. 4 is next a simplified block diagram of depicting an example first access node that could operate in accordance with the present disclosure. As shown, the example first access node includes a wireless communication interface 50, a network communication interface 52, and a controller 54, all of which may be communicatively linked together by a system bus, network, or other connection mechanism 56.

In the context discussed above, this first access node could be configured to engage in air-interface communication and to provide service according to a first RAT through the wireless communication interface 50. Further, the first access node could be provided in a wireless communication system that includes multiple second access nodes each configured to provide service according to a second RAT. As noted above, these access nodes may be collocated.

In this example first access node, the wireless communication interface 50 could comprise an antenna structure, which could be tower mounted or could take other forms, and associated components such as a power amplifier and a wireless transceiver, so as to facilitate providing a coverage area defining an air interface having a downlink and an uplink, and engaging in transmission and reception of user-plane data and control-plane signaling over the air interface in accordance with the first RAT. And the network communication interface 52 could comprise a wired or wireless interface, such as an Ethernet network communication interface, configured to support communication with other entities, such as with the other access node and various core-network entities.

Further, controller 54 could comprise a processing unit (e.g., one or more general purpose processors and/or specialized processors) programmed to cause the first access node to carry out various operations such as those discussed above. For instance, the controller could comprise non-transitory data storage (e.g., one or more magnetic, optical, or flash storage components) holding program instructions executable by the processing unit to cause the access node to carry out such operations.

In an example implementation, these operations could include, when a UE has a first connection with the first access node according to the first RAT (a) determining measures of uplink path loss of the second access nodes, including determining a measure of uplink path loss respectively of each second access node of the multiple second access nodes, (b) selecting one of the second access nodes from among the multiple second access nodes, the selecting being based on the determined measure of uplink path loss of the selected second access node being lowest of the determined measures of uplink path loss of the multiple candidate second access nodes, and (c) based on the selecting, configuring the dual-connectivity service for the UE, with the UE having the first connection with the first access node and having the second connection with the selected second access node.

Various features discussed above could be implemented in this context as well, and vice versa.

While the above description focuses mainly on use of uplink path loss as a basis to control configuration of dual-connectivity service, note also that uplink path loss can also be used as a basis to control service while a UE is served with dual connectivity. By way of example, when a UE is served concurrently by an MN (e.g., 4G eNB) over a first connection (e.g., a 4G LTE connection) and an SN (e.g., 5G gNB) over a second connection (e.g., a 5G NR connection), the uplink path loss respectively of the MN and SN could be used as a basis to control which connection is used for a given communication, and/or the extent of communication that should be carried on one connection versus the other.

As a specific example of this, when the UE is going to initiate a voice over Internet Protocol (VoIP) call, the UE may have a choice of whether (i) to initiate the call over the UE's first connection with the MN (e.g., as a voice-over-LTE (VoLTE) call) or rather (ii) to initiate the call over the UE's second connection with the SN (e.g., as a voice-over-NR (VoNR) call). That is, the UE may face a choice of which of the two access nodes to use as the serving access node for the VoIP call. Likewise, the UE may face a similar choice for other types of communications.

Given this choice, the UE could determine the measures of uplink path loss respectively of the MN and of the SN, and the UE could use those measures of uplink path loss as a basis to make the decision.

The UE could determine in various ways the measure of uplink path loss respectively of the MN and of the SN. For instance, each access node could broadcast an indication of its measure of uplink path loss, perhaps in a broadcast channel message on the access node's carrier, and the UE could read those broadcast indications to determine each access node's respective measure of uplink path loss. Alternatively, the MN might transmit to the UE a unicast message, such as an RRC configuration message, that specifies the MN's uplink path loss and the SN's uplink path loss, and the UE could read that message to determine each access node's respective uplink path loss.

The UE could then use the measures of uplink path loss of the MN and SN as a basis to decide which access node and connection to use for initiating the VoIP call. For instance, the UE could compare the measure of uplink path loss of the MN with the measure of uplink path loss of the SN and could determine based on that comparison which of the access nodes has a lower uplink path loss. And, based on that determination, the UE could select that access node. Accordingly, the UE could then initiate its VoIP call on its connection with the selected access node rather than on its connection with the other access node. For instance, the UE could engage in Session Initiation Protocol (SIP) signaling through the selected access node to initiate the VoIP call and could engage in control signaling to set up a voice-call bearer through the selected access node. Variations on this process could be possible as well.

Further, note that this process could also apply where a UE is served concurrently with standalone service by a first access node under a first RAT and standalone service by a second access node under a second RAT. That is, the process could apply even without dual-connectivity (non-standalone connectivity) but rather with two or more concurrent standalone connections.

Accordingly, a method could be provided for controlling service when a UE is served concurrently (i) by a first access node in accordance with a first radio access technology and (ii) by a second access node in accordance with a second radio access technology. The method could include determining a first measure of uplink path loss of the first access node and a second measure of uplink path loss of the second access node. Further, the method could include comparing the determined first measure of uplink path loss of the first access node with the determined second measure of uplink path loss of the second access node. And the method could include, based on the comparing, selecting between the first access node and the second access node as an access node through which to initiate a communication (e.g., a VoIP call). The method could then include initiating the communication through the selected access node rather than through the other access node of the first access node and the second access node.

In an example implementation of this method, the first access node may have lower measure of uplink path loss than the second access node, in which case the act of selecting between the first access node and the second access node as the access node through which to initiate the communication could involve selecting the first access node based on the first access node having a lower measure of uplink path loss than the second access node.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling configuration of dual-connectivity service for a user equipment device (UE), wherein the dual-connectivity service comprises the UE being served concurrently over a first connection according to a first radio access technology (RAT) and over a second connection according to a second RAT, the method comprising:
   determining, by a first access node with which the UE has the first connection according to the first RAT, measures of uplink path loss of multiple candidate second access nodes, including determining a measure of uplink path loss respectively of each second access node of the multiple candidate second access nodes;
   selecting by the first access node one of the second access nodes from among the multiple candidate second access nodes, the selecting being based on a comparison of the determined measure of uplink path loss of the selected second access node with the determined measure of uplink path loss respectively of each other second access node of the multiple candidate second access node; and
   based on the selecting, configuring the dual-connectivity service for the UE, with the UE having the first connection with the first access node and having the second connection with the selected second access node.

2. The method of claim 1, wherein determining the measure of uplink path loss respectively of each of at least one of the second access nodes comprises receiving from the second access node the measure of uplink path loss, wherein the measure of uplink path loss of the second access node represents a computed difference between transmit power and receive power of each of one or more uplink transmissions to the second access node.

3. The method of claim 1, wherein determining the measure of uplink path loss respectively of each of at least one of the second access nodes comprises receiving the measure of uplink path loss from a network entity to which the second access node reported the measure of uplink path loss.

4. The method of claim 1, wherein the measure of uplink path loss respectively of at least one of the second access nodes is based on historical data, over one or more past days, for a current time of day.

5. The method of claim 1, wherein the selecting is based on the determined measure of uplink path loss of the selected second access node being lowest of the determined measures of uplink path loss of the multiple candidate second access nodes.

6. The method of claim 1, wherein configuring the dual-connectivity service for the UE with the UE having the first connection with the first access node and having the second connection with the selected second access node comprises:
   engaging by the first access node in signaling to configure the second connection between the UE and the candidate second access node; and
   engaging by the first access node in signaling to establish for the UE a split bearer so that the first access node and second access node can both serve the UE with data communications.

7. The method of claim 1, wherein the first RAT is 4G Long Term Evolution (LTE), wherein the second RAT is 5G New Radio (NR), and wherein the dual-connectivity service is EUTRA-NR Dual Connectivity (EN-DC).

8. A method for controlling configuration of dual-connectivity service for a user equipment device (UE), wherein the dual-connectivity service comprises the UE being served concurrently over a first connection according to a first radio access technology (RAT) and over a second connection according to a second RAT, the method comprising:
  determining, by a first access node with which the UE has the first connection according to the first RAT, a measure of uplink path loss of a candidate second access node;
  using, by the first access node, the determined measure of uplink path loss of the candidate second access node as a basis to make a decision of whether to configure the dual-connectivity service with the UE having the second connection with the candidate second access node; and
  controlling, by the first access node, configuration of the dual-connectivity service for the UE in accordance with the decision.

9. The method of claim 8, wherein determining the measure of uplink path loss of the candidate second access node comprises receiving from the candidate second access node a report of the measure of uplink path loss of the candidate second access node, wherein the measure of uplink path loss of the candidate second access node represents a computed difference between transmit power and receive power of each of one or more uplink transmissions to the candidate second access node.

10. The method of claim 8, wherein determining the measure of uplink path loss of the candidate second access node comprises receiving an indication of the measure of uplink path loss from a network entity to which the candidate second access node reported the measure of uplink path loss.

11. The method of claim 8, wherein determining the measure of uplink path loss of the candidate second access node comprises predicting the measure of uplink path loss of the candidate second access node.

12. The method of claim 8, wherein using the determined measure of uplink path loss of the candidate second access node as a basis to make the decision of whether to configure the dual-connectivity service with the UE having the second connection with the candidate second access node comprises:
  making a determination of whether the determined measure of uplink path loss of the candidate second access node is at least predefined threshold high; and
  responsive to the determination being that the determined measure of uplink path loss of the candidate second access node is at least predefined threshold high, then, based at least on the determination, deciding to not configure the dual-connectivity service with the UE having the second connection with the candidate second access node.

13. The method of claim 8, wherein using the determined measure of uplink path loss of the candidate second access node as a basis to make the decision of whether to configure the dual-connectivity service with the UE having the second connection with the candidate second access node comprises:
  making a determination of whether the determined measure of uplink path loss of the candidate second access node is greater than a determined measure of uplink path loss of another candidate access node;
  if the determination is that the determined measure of uplink path loss of the candidate second access node is greater than the determined measure of uplink path loss of the other candidate access node, then, based at least on the determination, deciding to not configure the dual-connectivity service with the UE having the second connection with the candidate second access node; and
  if the determination is that the determined measure of uplink path loss of the candidate second access node is not greater than the determined measure of uplink path loss of the other candidate access node, then, based at least on the determination, deciding to configure the dual-connectivity service with the UE having the second connection with the candidate second access node.

14. The method of claim 13, further comprising:
  if the determination is that the determined measure of uplink path loss of the candidate second access node is greater than the determined measure of uplink path loss of the other candidate access node, then, based at least on the determination, configuring the dual-connectivity service with the UE having the second connection with the other candidate access node rather than with the candidate second access node.

15. The method of claim 8, wherein the first RAT is 4G Long Term Evolution (LTE), wherein the second RAT is 5G New Radio (NR), and wherein the dual-connectivity service is EUTRA-NR Dual Connectivity (EN-DC).

16. In a wireless communication system comprising a first access node configured to provide service according to a first radio access technology (RAT) and a plurality of second access nodes each configured to provide service according to a second RAT, the first access node comprising:
  a wireless communication interface through which to engage in air-interface communication and provide the service according to the first RAT; and
  a controller, wherein the controller is configured to cause the first access node to carry out operations when a user equipment device (UE) has a first connection with the first access node according to the first RAT, the operations including:
    determining measures of uplink path loss of the plurality of second access nodes, including determining a measure of uplink path loss respectively of each second access node of the plurality of second access nodes,
    selecting one of the second access nodes from among the plurality of second access nodes, the selecting being based on the determined measure of uplink path loss of the selected second access node being lowest of the determined measures of uplink path loss of the plurality of second access nodes, and
    based on the selecting, configuring the dual-connectivity service for the UE, with the UE having the first connection with the first access node and having the second connection with the selected second access node.

17. The first access node of claim 16, wherein determining the measure of uplink path loss respectively of each of at least one of the second access nodes comprises receiving from the second access node the measure of uplink path loss, wherein the measure of uplink path loss of the second access node represents a computed difference between transmit power and receive power of each of one or more uplink transmissions to the second access node.

18. The first access node of claim 16, wherein the measure of uplink path loss of at least one of the second access nodes is based on historical data, over one or more past days, for a current time of day.

19. The first access node of claim 16, wherein configuring the dual-connectivity service for the UE with the UE having the first connection with the first access node and having the second connection with the selected second access node comprises:
   engaging in signaling to configure the second connection between the UE and the candidate second access node; and
   engaging by the first access node in signaling to establish for the UE a split bearer so that the first access node and second access node can both serve the UE with data communications.

20. The first access node of claim 16, wherein the first RAT is 4G Long Term Evolution (LTE), wherein the second RAT is 5G New Radio (NR), and wherein the dual-connectivity service is EUTRA-NR Dual Connectivity (EN-DC).

* * * * *